(12) United States Patent
Gao et al.

(10) Patent No.: US 10,175,491 B2
(45) Date of Patent: Jan. 8, 2019

(54) APPARATUS FOR OPTICAL SEE-THROUGH HEAD MOUNTED DISPLAY WITH MUTUAL OCCLUSION AND OPAQUENESS CONTROL CAPABILITY

(71) Applicant: Magic Leap, Inc., Plantation, FL (US)

(72) Inventors: Chunyu Gao, Tucson, AZ (US); Yuxiang Lin, Tucson, AZ (US); Hong Hua, Tucson, AZ (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 15/977,593

(22) Filed: May 11, 2018

(65) Prior Publication Data

US 2018/0299677 A1  Oct. 18, 2018

Related U.S. Application Data

(62) Division of application No. 15/833,945, filed on Dec. 6, 2017, now Pat. No. 10,048,501, which is a division
(Continued)

(51) Int. Cl.
| | | |
|---|---|---|
| G02B 26/00 | (2006.01) |
| G02F 1/01 | (2006.01) |
| G02B 27/01 | (2006.01) |
| G02B 27/28 | (2006.01) |
| G02B 27/14 | (2006.01) |

(Continued)

(52) U.S. Cl.
CPC .......... *G02B 27/0172* (2013.01); *G02B 5/04* (2013.01); *G02B 13/06* (2013.01); *G02B 25/001* (2013.01); *G02B 27/1066* (2013.01); *G02B 27/144* (2013.01); *G02B 27/283* (2013.01); *G03B 37/02* (2013.01); *H04N 5/2258* (2013.01); *H04N 5/23238* (2013.01); *G02B 2027/015* (2013.01); *G02B 2027/0118* (2013.01); *G02B 2027/0145* (2013.01); *G06T 19/006* (2013.01)

(58) Field of Classification Search
CPC ... G02F 1/01; G02F 1/167; G02F 1/19; G02B 26/02; G02B 26/06; G02B 26/005; G02B 26/00
USPC ... 359/10, 11, 204.2, 217.2, 224.2, 237–297, 359/325; 349/24, 50
See application file for complete search history.

(56) References Cited

U.S. PATENT DOCUMENTS

| | | |
|---|---|---|
| 3,909,121 A | 9/1975 | de Mesquita Cardoso |
| 4,245,240 A | 1/1981 | Tanaka |

(Continued)

FOREIGN PATENT DOCUMENTS

| | | |
|---|---|---|
| AU | 2011204946 B1 | 12/2011 |
| EP | 1703310 | 9/2006 |

(Continued)

OTHER PUBLICATIONS

First Examination Report dated Jun. 1, 2018, Australian Patent Application No. 2017203227, (6 pages).
(Continued)

*Primary Examiner* — William R Alexander
*Assistant Examiner* — Tamara Y Washington
(74) *Attorney, Agent, or Firm* — David C. Lundmark

(57) ABSTRACT

The present invention comprises a compact optical see-through head-mounted display capable of combining, a see-through image path with a virtual image path such that the opaqueness of the see-through image path can be modulated and the virtual image occludes parts of the see-through image and vice versa.

2 Claims, 25 Drawing Sheets

Related U.S. Application Data of application No. 15/607,335, filed on May 26, 2017, now Pat. No. 9,874,752, which is a division of application No. 15/277,887, filed on Sep. 27, 2016, now Pat. No. 9,726,893, which is a division of application No. 13/857,656, filed on Apr. 5, 2013, now Pat. No. 9,547,174.

(60) Provisional application No. 61/620,574, filed on Apr. 5, 2012, provisional application No. 61/620,581, filed on Apr. 5, 2012.

(51) Int. Cl.

| | | |
|---|---|---|
| *G02B 27/10* | (2006.01) | |
| *G02B 13/06* | (2006.01) | |
| *G02B 25/00* | (2006.01) | |
| *G02B 5/04* | (2006.01) | |
| *G03B 37/02* | (2006.01) | |
| *H04N 5/232* | (2006.01) | |
| *H04N 5/225* | (2006.01) | |
| *G06T 19/00* | (2011.01) | |

(56) References Cited

U.S. PATENT DOCUMENTS

| | | |
|---|---|---|
| 5,135,183 A | 8/1992 | Whitney |
| 5,455,603 A | 10/1995 | Hori et al. |
| 5,517,352 A | 5/1996 | Hill |
| 5,706,137 A | 1/1998 | Kelly |
| 5,751,462 A | 5/1998 | Shiraishi et al. |
| 6,347,744 B1 | 2/2002 | Metlitsky |
| 6,356,392 B1 | 3/2002 | Spitzer |
| 6,457,834 B1 | 10/2002 | Cotton et al. |
| 6,593,561 B2 | 7/2003 | Bacarella et al. |
| 7,006,123 B2 | 2/2006 | Yoshikawa et al. |
| 7,084,904 B2 | 8/2006 | Liu |
| 7,542,090 B1 | 6/2009 | Merchant |
| 7,639,208 B1 | 12/2009 | Ha et al. |
| 7,839,575 B2 | 11/2010 | Dejong et al. |
| 7,940,299 B2 | 5/2011 | Geng |
| 7,952,783 B2 | 5/2011 | Holmes et al. |
| 7,973,834 B2 | 7/2011 | Yang |
| 2001/0000677 A1 | 5/2001 | Takagi |
| 2002/0113752 A1 | 8/2002 | Sullivan et al. |
| 2004/0150863 A1 | 8/2004 | Newman |
| 2004/0201769 A1 | 10/2004 | Yoshikawa et al. |
| 2005/0007673 A1 | 1/2005 | Chaoulov et al. |
| 2005/0083431 A1 | 4/2005 | Tsutsumi |
| 2005/0117015 A1 | 6/2005 | Cutler |
| 2005/0211872 A1 | 9/2005 | Kawano et al. |
| 2006/0023105 A1 | 2/2006 | Kostrzewski et al. |
| 2006/0028400 A1 | 2/2006 | Lapstun |
| 2006/0055811 A1 | 3/2006 | Fritz et al. |
| 2007/0002131 A1 | 1/2007 | Ritchey |
| 2007/0110335 A1 | 5/2007 | Taylor et al. |
| 2007/0182812 A1 | 8/2007 | Ritchey |
| 2008/0097347 A1 | 4/2008 | Arvanaghi |
| 2008/0111881 A1 | 5/2008 | Gibbs et al. |
| 2009/0080695 A1 | 3/2009 | Yang |
| 2009/0185283 A1 | 7/2009 | Maetaki |
| 2010/0045773 A1 | 2/2010 | Ritchey |
| 2010/0202048 A1 | 8/2010 | Amitai et al. |
| 2011/0181689 A1 | 7/2011 | Kweon |
| 2011/0213664 A1 | 9/2011 | Osterhout et al. |
| 2011/0221767 A1 | 9/2011 | Kostrzewski et al. |
| 2012/0068913 A1 | 3/2012 | Bar-Zeev et al. |
| 2013/0016178 A1 | 1/2013 | Birkbeck et al. |
| 2013/0088567 A1 | 4/2013 | Fitzpatrick et al. |
| 2014/0293192 A1 | 10/2014 | Hatano |
| 2015/0188082 A1 | 7/2015 | Rohatgi |
| 2016/0018658 A1 | 1/2016 | Machida et al. |
| 2016/0077345 A1 | 3/2016 | Bohan et al. |
| 2017/0123204 A1 | 5/2017 | Sung et al. |

FOREIGN PATENT DOCUMENTS

| | | |
|---|---|---|
| JP | 57-171314 | 10/1982 |
| JP | 2000-105348 A | 4/2000 |
| JP | 2004-153605 A | 5/2004 |
| JP | 2004-191593 A | 7/2004 |
| JP | 2009-122379 A | 6/2009 |
| JP | 2009-128527 A | 6/2009 |
| WO | 2005/106543 A1 | 11/2005 |
| WO | 2010/053979 A2 | 5/2010 |
| WO | 2012/037290 A2 | 3/2012 |

OTHER PUBLICATIONS

First Examination Report dated Apr. 11, 2018, Australian Patent Application No. 2017201669, (8 pages).

Cakmacki, et al., "A Compact Optical See-through Head-Worn Display with Occlusion Support", Proceedings of the Third IEEE and ACM International Symposium on Mixed and Augmented Reality (ISMAR 2004), (10 pages).

Kawanishi, et al., "Generation of high-resolution stereo panoramic images by omnidirectional imaging sensor using hexagonal pyramidal mirrors", Pattern Recognition, 1998. Proceedings. Fourteenth International Conference on. vol. 1. IEEE, 1998., p. 485-489.

Tan, et al., "Multiview panoramic cameras using mirror pyramids", IEEE Transactions on Pattern Analysis and Machine Intelligence vol. 26 No. 7 2004, p. 941-946.

Extended European Search Report dated Jan. 11, 2016, European Patent Application No. 13772991.9, (6 pages).

Extended European Search Report dated May 31, 2016, European Patent Application No. 13817261.4 in the name of Magic Leap, Inc., (12 pages).

Final Office Action dated Jul. 11, 2017, U.S. Appl. No. 13/856,847, filed Apr. 4, 2013, (12 pages).

Final Office Action dated Nov. 19, 2015, U.S. Appl. No. 13/856,847, filed Apr. 4, 2013, (27 pages).

First Examination Report dated Mar. 15, 2016, New Zealand Patent Application No. 700898, (4 pages).

First Office Action dated Nov. 23, 2016, Chinese Patent Application No. 201380029492.0 (with English Translation), (23 pages).

First Office Action dated Jul. 28, 2016, Chinese Patent Application No. 201380029950.X (English Translation), (10 pages).

First Office Action dated Mar. 21, 2017, Japanese Patent Application No. 2015-504728 with English Translation, (9 pages).

First Office Action dated Mar. 27, 2018 with English Translation, Japanese Patent Application No. 2017-076771, (7 pages).

Fourth Office Action dated Dec. 29, 2017 with English Translation, Chinese Patent Application No. 201380029492.0, (6 pages).

Further Examination Report dated Jan. 9, 2018, New Zealand Patent Application No. 724344, (3 pages).

International Search Report and Written Opinion dated Jan. 15, 2014, International PCT Patent Application No. PCT/2013/035486 with International Filing Date of Apr. 5, 2013, (5 pages).

International Search Report dated Jul. 11, 2013, International PCT Patent Application No. PCT/US13/35293 with International Filing Date of Apr. 5, 2012, (5 pages).

Non Final Office Action dated Apr. 24, 2015, U.S. Appl. No. 13/856,847, filed Apr. 4, 2013, (22 pages).

Non Final Office Action dated Jun. 17, 2016, U.S. Appl. No. 13/856,847, filed Apr. 4, 2013, (30 pages).

Non Final Office Action dated Mar. 3, 2017, U.S. Appl. No. 13/856,847, filed Apr. 4, 2013, (30 pages).

Notice of Allowance dated Apr. 18, 2018, U.S. Appl. No. 15/833,945, (11 pages).

Patent Examination Report No. 1 dated Apr. 1, 2016, Australian Patent Application No. 2013243380, (3 pages).

Second Chinese Office Action dated Apr. 12, 2017, Chinese Patent Application No. 201380029950.X (English Translation), (13 pages).

Second Chinese Office Action dated Apr. 26, 2017, Chinese Patent Application No. 201380029492.0 (with English Translation), (11 pages).

(56) References Cited

OTHER PUBLICATIONS

Third Chinese Office Action dated Aug. 25, 2017, Chinese Patent Application No. 201380029492.0 (with English Translation), (7 pages).
Anonymous, , "Photoxels, What is . . . Aperture", http://web.archive.org/web/201 00301114939/http://www.photoxels.com/tutorial_ aperture.html, Mar. 1, 2010, 1 page.
Armitage, D. et al., "Near-to-eye Systems (Chapter11)", Introduction to Microdisplays, John Wiley & Sons, Jan. 1, 2006, (pp. 337-363).
Hua, Hong et al., "Dual-sensor foveated imaging system", College of Optical Sciences, University of Arizona, Jan. 14, 2008, (11 pages).
Kiyokawa, K. et al., "An occlusion-capable optical see-through head mount display for supporting co-located collaboration", Proceedings/The Second IEEE and ACM International Symposium on mixed and Augmented Reality: Oct. 7-10, 2003, Tokyo Japan, IEEE Computer Society, Los Alamitos, California, Oct. 7, 2003, (pp. 133-141).
Kiyokawa, K. et al., "An optical see-through display for mutual occulusion of real and virtual environments", Augmented Realtiy, 2000 (ISAR2000). Proceedings. IEEE and ACM International Symposium on Munich, Germany, Oct. 5-6, 2000, Piscataway, NL, USA, IEEE, US, Oct. 5, 2000, (pp. 60-67).

Table 1: Optical surface prescription of surface 1 of the eyepiece prism

| | |
|---|---|
| X Curvature ($c_x$) | 4.081000E-02 |
| Y Curvature ($c_y$) | 2.988100E-02 |
| Y Conic Constant ($K_y$) | 1.987470E-01 |
| 4th Order Symmetric Coefficient (AR) | -4.287832E-06 |
| 6th Order Symmetric Coefficient (BR) | 3.633440E-09 |
| 8th Order Symmetric Coefficient (CR) | -1.116535E-11 |
| 10th Order Symmetric Coefficient (DR) | 1.223496E-14 |
| X Conic Constant ($K_x$) | -8.920693E-01 |
| 4th Order Asymmetric Coefficient (AP) | 9.693257E-01 |
| 6th Order Asymmetric Coefficient (BP) | 8.481634E-01 |
| 8th Order Asymmetric Coefficient (CP) | 4.066970E-01 |
| 10th Order Asymmetric Coefficient (DP) | 1.459075E-01 |

Fig.13

Table 2: Optical surface prescription of surface 2 of the eyepiece prism

| | |
|---|---|
| X Curvature ($c_x$) | -1.611284E-03 |
| Y Curvature ($c_y$) | -5.784086E-03 |
| Y Conic Constant ($K_Y$) | -4.979329E+00 |
| 4th Order Symmetric Coefficient (AR) | -1.025813E-011 |
| 6th Order Symmetric Coefficient (BR) | 2.719940E-017 |
| 8th Order Symmetric Coefficient (CR) | 1.442892E-25 |
| 10th Order Symmetric Coefficient (DR) | -4.878044E-18 |
| X Conic Constant ($K_X$) | 1.000000E+01 |
| 4th Order Asymmetric Coefficient (AP) | 2.838784E+02 |
| 6th Order Asymmetric Coefficient (BP) | -9.780753E-01 |
| 8th Order Asymmetric Coefficient (CP) | -1.504189E+03 |
| 10th Order Asymmetric Coefficient (DP) | 2.196970E+00 |

Fig.14

Table 3: Optical surface prescription of surface 3 of the eyepiece prism

| | |
|---|---|
| X Curvature ($c_x$) | 3.264493E-02 |
| Y Curvature ($c_y$) | 1.604889E-02 |
| Y Conic Constant ($K_Y$) | -6.037602E+00 |
| 4th Order Symmetric Coefficient (AR) | -8.012300E-07 |
| 6th Order Symmetric Coefficient (BR) | 8.479952E-15 |
| 8th Order Symmetric Coefficient (CR) | -6.754428E-11 |
| 10th Order Symmetric Coefficient (DR) | 1.954349E-13 |
| X Conic Constant ($K_X$) | -9.850983E+00 |
| 4th Order Asymmetric Coefficient (AP) | 3.375134E+00 |
| 6th Order Asymmetric Coefficient (BP) | 8.002480E+01 |
| 8th Order Asymmetric Coefficient (CP) | -7.586874E-01 |
| 10th Order Asymmetric Coefficient (DP) | -8.514982E-01 |

Fig.15

Table 4: Position and orientation parameters of the eyepiece prism

| Surface | Reference | Position | | | Orientation |
|---|---|---|---|---|---|
| | | X(mm) | Y(mm) | Z(mm) | RX(Degree) |
| S1 | Exit Pupil | 0 | 9.5606 | 19.6489 | -17.0526 |
| S2 | Exit Pupil | 0 | -4.0538 | 27.3329 | -49.5143 |
| S3 | Exit Pupil | 0 | 14.6036 | 23.4707 | -95.6210 |
| | | | | | |
| Notes: The orientations of the surface related to Y and Z axis are zeros. | | | | | |

Fig.16

Table 5: Optical surface prescription of surface 4 of the objective prism

| | |
|---|---|
| X Curvature ($c_x$) | 2.434864E-02 |
| Y Curvature ($c_y$) | -2.209971E-02 |
| Y Conic Constant ($K_Y$) | -1.000000E+01 |
| 4th Order Symmetric Coefficient (AR) | 1.502099E-05 |
| 6th Order Symmetric Coefficient (BR) | -2.061756E-08 |
| 8th Order Symmetric Coefficient (CR) | 4.0174857E-02 |
| 10th Order Symmetric Coefficient (DR) | 8.756049E-14 |
| X Conic Constant ($K_X$) | -1.000000E+01 |
| 4th Order Asymmetric Coefficient (AP) | 9.512637E-01 |
| 6th Order Asymmetric Coefficient (BP) | 1.093572E+00 |
| 8th Order Asymmetric Coefficient (CP) | 1.900420E+02 |
| 10th Order Asymmetric Coefficient (DP) | 9.736468E-01 |

Fig.17

Table 6: Optical surface prescription of surface 5 of the objective prism

| | |
|---|---|
| X Curvature ($c_x$) | -3.809807E-04 |
| Y Curvature ($c_y$) | -8.764721E-03 |
| Y Conic Constant ($K_Y$) | -1.000000E+01 |
| 4th Order Symmetric Coefficient (AR) | 1.979731E-06 |
| 6th Order Symmetric Coefficient (BR) | -8.425507E-11 |
| 8th Order Symmetric Coefficient (CR) | 6.094541E-12 |
| 10th Order Symmetric Coefficient (DR) | 1.588220E-14 |
| X Conic Constant ($K_X$) | 1.000000E+01 |
| 4th Order Asymmetric Coefficient (AP) | 4.7341916E-02 |
| 6th Order Asymmetric Coefficient (BP) | 2.306220E+00 |
| 8th Order Asymmetric Coefficient (CP) | -1.417271E-01 |
| 10th Order Asymmetric Coefficient (DP) | 6.686172E-01 |

Fig.18

Table 7: Optical surface prescription of surface 6 of the eyepiece prism

| | |
|---|---|
| X Curvature ($c_x$) | 4.346197E-02 |
| Y Curvature ($c_y$) | -5.219668E-03 |
| Y Conic Constant ($K_Y$) | 1.000000E+01 |
| 4th Order Symmetric Coefficient (AR) | 3.576498E-05 |
| 6th Order Symmetric Coefficient (BR) | -5.751877E-08 |
| 8th Order Symmetric Coefficient (CR) | 6.047870E-12 |
| 10th Order Symmetric Coefficient (DR) | 2.412166E-13 |
| X Conic Constant ($K_X$) | -1.237477E+00 |
| 4th Order Asymmetric Coefficient (AP) | 8.171339E-01 |
| 6th Order Asymmetric Coefficient (BP) | 9.892018E-01 |
| 8th Order Asymmetric Coefficient (CP) | 1.883807E+00 |
| 10th Order Asymmetric Coefficient (DP) | 8.762551E-01 |

Fig.19

Table 8: Position and orientation parameters of the eyepiece prism

| Surface | Reference | Position | | | Orientation |
|---|---|---|---|---|---|
| | | X(mm) | Y(mm) | Z(mm) | RX(Degree) |
| S4 | Exit Pupil | 0 | -16.8091 | 57.5080 | 90 |
| S5 | Exit Pupil | 0 | 27.5542 | 53.4643 | 46.5961 |
| S6 | Exit Pupil | 0 | 29.3328 | 42.9264 | 0 |
| | | | | | |
| Notes: The orientations of the surface related to Y and Z axis are zeros. | | | | | |

Fig.20

Table 9: Surface parameters for DOE plates 882 and 884

| DOE PLATE 882 | | | | Surface Type | | Phase Polynomial | |
|---|---|---|---|---|---|---|---|
| Order | -1 | Wavelength | 525 | C1 | 1.510868E-03 | C2 | 8.686348E-07 |
| C3 | -1.442096E-08 | C4 | 1.457094E-11 | C5 | 3.716912E-16 | C6 | 0 |
| DOE PLATE 884 | | | | Surface Type | | Phase Polynomial | |
| Order | -1 | Wavelength | 525 | C1 | 1.670984E-03 | C2 | -6.386541E-05 |
| C3 | 1.112894E-06 | C4 | 3.187964E-08 | C5 | -6.565464E-10 | C6 | 0 |

Notes:

1. Higher order diffraction coefficients which are not listed in the table are all zeros.
2. The DOEs are rotationally symmetric kinoform. The phase profile (in radians) is given by $\emptyset = (\frac{2\pi}{\lambda}) \sum C_n r^{2n}$

Fig.21

Table 10: Optical surface prescription of surface 1 of the freeform prism

| | |
|---|---:|
| X Curvature ($c_x$) | 4.278629E-02 |
| Y Curvature ($c_y$) | 2.793086E-02 |
| Y Conic Constant ($K_Y$) | 5.539179E-01 |
| 4th Order Symmetric Coefficient (AR) | 2.384298E-05 |
| 6th Order Symmetric Coefficient (BR) | 5.593087E-10 |
| 8th Order Symmetric Coefficient (CR) | -6.676271E-11 |
| 10th Order Symmetric Coefficient (DR) | 1.898202E-13 |
| X Conic Constant ($K_X$) | -2.759333E+00 |
| 4th Order Asymmetric Coefficient (AP) | -8.260022E-02 |
| 6th Order Asymmetric Coefficient (BP) | -2.156011E+00 |
| 8th Order Asymmetric Coefficient (CP) | 1.146916E-01 |
| 10th Order Asymmetric Coefficient (DP) | 3.497628E-03 |

Fig.22

Table 11: Optical surface prescription of surface 2 of the freeform prism

| | |
|---|---|
| X Curvature ($c_x$) | -3.296631E-03 |
| Y Curvature ($c_y$) | -3.711743E-03 |
| Y Conic Constant ($K_Y$) | -1.000000E+01 |
| 4th Order Symmetric Coefficient (AR) | 1.804204E-06 |
| 6th Order Symmetric Coefficient (BR) | -1.235898E-09 |
| 8th Order Symmetric Coefficient (CR) | -2.620772E-13 |
| 10th Order Symmetric Coefficient (DR) | 5.583141E-17 |
| X Conic Constant ($K_X$) | 1.000000E+01 |
| 4th Order Asymmetric Coefficient (AP) | -3.313665E-01 |
| 6th Order Asymmetric Coefficient (BP) | -3.276169E-01 |
| 8th Order Asymmetric Coefficient (CP) | -1.466264E+00 |
| 10th Order Asymmetric Coefficient (DP) | -1.660210E-02 |

Fig.23

Table 12: Optical surface prescription of surface 3 of the freeform prism

| | |
|---|---|
| Y Curvature ($c_y$) | 3.439552E-02 |
| Y Conic Constant ($K_Y$) | -4.444242E-01 |
| 4th Order Symmetric Coefficient (AR) | -2.930814E-05 |
| 6th Order Symmetric Coefficient (BR) | -1.066819E-07 |
| 8th Order Symmetric Coefficient (CR) | 5.316229E-10 |
| 10th Order Symmetric Coefficient (DR) | -3.009446E-12 |
| DOE: Phase Polynomial | Phase profile (in radians) $\varnothing = (\frac{2\pi}{\lambda}) \sum C_n r^{2n}$ |
| Diffraction Order | 1 |
| Construction Wavelength | 525 |
| C1 | -1.566805E-03 |
| C2 | 2.645948E-06 |
| C3 | -3.424953E-08 |
| C4 | 1.207953E-10 |
| C5 | -9.856222E-16 |

Fig.24

Table 13: Position and orientation parameters of the freeform prism as the eyepiece

| Surface | Reference | Position | | | Orientation |
|---|---|---|---|---|---|
| | | X(mm) | Y(mm) | Z(mm) | RX(Degree) |
| S1 | Exit Pupil | 0 | -10.5982 | 19.3421 | 16.6034 |
| S2 | Exit Pupil | 0 | -12.4384 | 15.7974 | -50.1726 |
| S3 | Exit Pupil | 0 | -10.7093 | 28.54 | -95.1287 |
| | | | | | |
| Notes: The orientations of the surface related to Y and Z axis are zeros. | | | | | |

Fig.25

APPARATUS FOR OPTICAL SEE-THROUGH HEAD MOUNTED DISPLAY WITH MUTUAL OCCLUSION AND OPAQUENESS CONTROL CAPABILITY

RELATED APPLICATIONS

This application is a division of U.S. patent application Ser. No. 15/833,945, filed on Dec. 6, 2017, which is a division of U.S. patent application Ser. No. 15/607,335, filed on May 26, 2017 now U.S. Pat. No. 9,874,752, which is a division of U.S. patent application Ser. No. 15/277,887, filed on Sep. 27, 2016 now U.S. Pat. No. 9,726,893, which is a division of U.S. patent application Ser. No. 13/857,656, filed on Apr. 5, 2013 now U.S. Pat. No. 9,547,174, which claims priority to U.S. Provisional Application No. 61/620,574, filed on Apr. 5, 2012 and U.S. Provisional Application No. 61/620,581, filed on Apr. 5, 2012, the disclosures of which are incorporated herein by reference in their entirety.

GOVERNMENT LICENSE RIGHTS

This invention was partially made with government support under SBIR contract No. W91CRB-12-C-0002 awarded by the U.S. ARMY. The government has certain rights in the invention.

FIELD OF THE TINE INVENTION

The present invention relates generally to Head Mounted Displays, and more particularly, but not exclusively, to optical see-through head-mounted displays with opaqueness control and mutual occlusion capability in which real objects may be occluded by computer-rendered virtual objects situated in front or vice versa.

BACKGROUND OF THE INVENTION

Over the past decades, Augmented Reality (AR) technology has been applied in many application fields, such as medical and military training, engineering design and prototyping, tele-manipulation and tele-presence, and personal entertainment systems. See-through Head-Mounted Displays (ST-HMD) are one of the enabling technologies of an augmented reality system for merging virtual views with a physical scene. There are two types of ST-HMDs: optical and video (J. Rolland and H. Fuchs, "Optical versus video see-through head mounted. displays," In Fundamentals of Wearable Computers and Augmented Reality, pp. 113-157, 2001.). The major drawbacks of the video see-through approach include: degradation of the image quality of the see-through view; image lag due to processing of the incoming video stream; potentially loss of the see-through view due to hardware/software malfunction. In contrast, the optical see-through HMD (OST-HMD) provides a direct view of the real world through a beamsplitter and thus has minimal affects to the view of the real world. It is highly (preferred in demanding applications where a user's awareness to the live environment is paramount.

Developing optical see-through HMDs, however, confronts complicated technical challenges. One of the critical issues lies in that the virtual views in an OST-HMD appear "ghost-like" and are floating in the real world due to the lack of the occlusion capability. FIG. 1 shows a comparison illustration of the augmented view seen through a typical OST-HWID (FIG. 1a) and the augmented view seen through an occlusion capable OST-HMD (OCOST-HMD) system (FIG. 1b), In the figure, a virtual car model is superimposed on a solid platform which represents a real object. Without proper occlusion management as shown in FIG. 1a, in a typical AR view, the car is mixed with the platform and it is difficult to distinguish the depth relationship of the car and the platform. On the contrary, with proper occlusion management as shown in FIG. 1b, the car blocks a portion of the platform and it can be clearly identified that the car seats on the top of the platform. Adding occlusion capability to the AR display enables realistically merging virtual objects into the real environment. Such occlusion-enabled capability may generate transformative impacts on AR display technology and is very appealing for many augmented-reality based applications.

An OCOST-HMD system typically comprises of two key sub-systems. The first is an eyepiece optics that allows a user to see a magnified image displayed on a microdisplay; and the second is a relay optics that collects and modulates the light from an external scene in the real world, which enables the opaqueness and occlusion control on the external scene when presenting to the viewers. The key challenges of creating truly portable and lightweight OCOST-HMD system lies in addressing three cornerstone issues: (1) an optical scheme that allows the integration of the two subsystems without adding significant weight and volume to the system. (2) a proper optical method that maintains the parity of the coordinate system of the external scene; (3) an optical design method that enables the design of these optical subsystems with an elegant form factor, which has been a persisting dream for HMD developers. Several occlusion-capable optical ST-HMD concepts have been developed (U.S. Pat. No. 7,639,208 B1 Kiyokawa, K., Kurata, Y., and Ohno, H., "An Optical See-through Display for Mutual Occlusion with a Real-time Stereo Vision System," Elsevier Computer & Graphics, Special Issue on "Mixed Realities—Beyond. Conventions," Vol, 25, No. 5, pp. 2765-779, 2001. K. Kiyokawa, M, Billinghurst, B. Campbell, E. Woods, "An Occlusion-Capable Optical See-through Head Mount Display for Supporting Co-located Collaboration," ISMAR 2003, pp, 133-141). For example, Kiyokawa et. al. developed ELMO series occlusion displays using conventional lenses, prisms and minors. Not only because of the number of elements being used, but also more importantly due to the rotationally symmetric nature of the optical systems, the existing occlusion-capable OST-HMDs have a helmet-like, bulky form factor. They have been used exclusively in laboratory environments due to the heavy weight and cumbersome design. The cumbersome, helmet-like form factor prevents the acceptance of the technology for many demanding and emerging applications.

SUMMARY OF THE INVENTION

This invention concerns an optical see-through head mounted display (OST-HMD) device with opaqueness control and mutual occlusion capability, The display system typically comprises of a virtual view path for viewing a displayed virtual image and a see-through path for viewing an external scene in the real world. In the present invention, the virtual view path includes a miniature image display unit for supplying virtual image content and an eyepiece through which a user views a magnified virtual image. The see-through path comprises of an objective optics to directly capture the light from the external scene and firm at least one intermediate image, a spatial light modular (SLM) placed at or near an intermediate image plane in the see-through path to control and modulate the opaqueness of the see-through view, and an eyepiece optics through which the modulated see-through view is seen by the viewer. In the see-through path, the objective optics and eyepiece together act as a relay optics for passing the light from the real world to viewer's eye. To achieve a compact form factor and reduce the viewpoint offset, the see-through path is folded into two layers through several reflective surfaces, a front layer accepting the incoming light from an external scene and a back layer coupling the light captured by the front layer into a viewer's eye. The see-through path is merged with the virtual image path by a beamsplitter so that the same the eyepiece is shared by both paths for viewing displayed virtual content and the modulated see-through image. The microdisplay and the SLM are optically conjugate to each other through the beamsplitter, which makes the pixel level occlusion manipulation possible. In the present invention, the eyepiece, the objective optics, or both may be rotationally symmetric lenses or non-rotationally symmetric freeform optics. In one of its significant aspects, the present invention may utilize freeform optical technology in eyepiece optics, objective optics or both to achieve a compact and lightweight OCOST-HMD design.

The reflective surfaces for folding the optical paths may be planar mirrors, spherical, aspherical, or freeform surfaces with optical power. In another significant aspect of the present invention, some of the reflective surfaces may utilize freeform optical technology. Some of the reflective surfaces may also be strategically designed to be an integral part of the eyepiece or objective optics where the reflective surfaces not only facilitate the folding of the optical path for achieving compact display design but also contribute optical power and correct optical aberrations. In an exemplary configuration, the present invention may use a one-reflection or multi-reflection freeform prism as an eyepiece or objective optics where the prism is a single optical element comprises of refractive surfaces and one or more than one reflective surfaces for folding the optical path and correcting aberrations.

In another significant aspect of the present invention, the objective optics in the see-through path forms at least one accessible intermediate image, near which an SLM is placed to provide opaqueness control and see-through modulation. In the present invention, either a reflection-type SLM or a transmission-type SLM may be used for modulating the see-through view for occlusion control. A longer back focal distance for the objective optics is required for a reflection-type SLM than a transmission-type SLM. A reflection-type SLM may have the advantage of higher light efficiency than a transmission-type SLM.

In another significant aspect of the present invention, the see-through path may form an odd or even number of intermediate images. In the case of an odd number of intermediate images, an optical method is provided to invert and/or revert the see-through view in the see-through path. For example, depending on the number of reflections involved in the see-through path, examples of the possible methods include, but not limited to, inserting an additional reflection or reflections, utilizing a roof mirror surface, or inserting an erection prism or lens. In the case of an even number of intermediate images, no image erection element is needed if there is no parity change in the see-through view. For instance, multiple-reflection freeform prism structure (typical more than 2) may be utilized as eyepiece or objective optics, or both, which allow folding the see-through optical path inside the objective and/or eyepiece prism multiple times and form intermediate image(s) inside the prisms which eliminates the necessity of using an erection roof reflective surface. The potential advantage of eliminating the erection prism is that the approach may lead to a more compact design.

BRIEF DESCRIPTION OF THE DRAWINGS

The foregoing summary and the following detailed description of exemplary embodiments of the present invention may be further understood when read in conjunction with the appended drawings, in which:

FIG. 13 shows Table 1: Optical surface prescription of surface 1 of the eyepiece prism FIG. 14 shows Table 2: Optical surface prescription of surface 2 of the eyepiece prism FIG. 15 shows Table 3: Optical surface prescription of surface 3 of eyepiece prism FIG. 16 shows Table 4: Position and orientation parameters of the eyepiece prism FIG. 17 shows Table 5: Optical surface prescription of surface 4 of the objective prism FIG. 18 shows Table 6: Optical surface prescription of surface 5 of the objective prism FIG. 19 shows Table 7: Optical surface prescription of surface 6 of the objective prism FIG. 20 shows Table 8: Position and orientation parameters of the objective prism FIG. 21 shows Table 9: Surface parameters for DOE plates 882 and 884

FIG. 22 shows Table 10: Optical surface prescription of surface 1 of the freeform prism FIG. 23 shows Table 11: Optical surface prescription of surface 2 of the freeform prism FIG. 24 shows Table 12: Optical surface prescription of surface 3 of the freeform prism FIG. 25 shows Table 13: Position and orientation parameters of the freeform prism as the eyepiece

DETAILED DESCRIPTION OF THE INVENTION

Figure 1A:
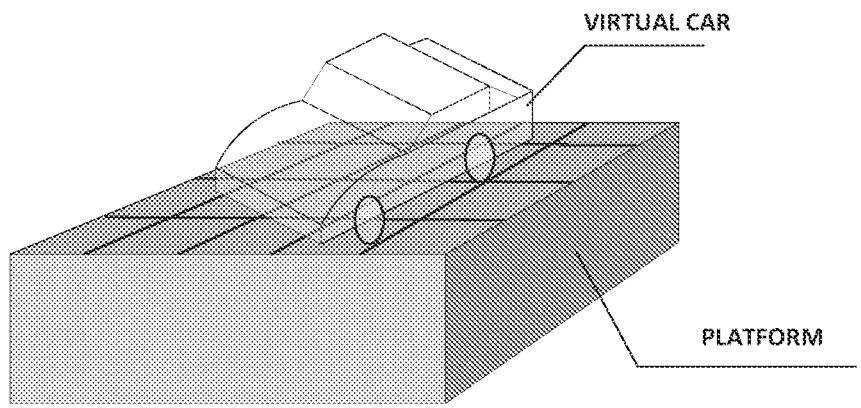
FIGS. 1a and 1b schematically illustrate AR views seen through an optical see-through HMD: without occlusion capability (FIG. 1a) and with occlusion capability (FIG. 1b), FIGS. 2a and 2b schematically illustrate an exemplary optical accordance with the present invention shown as a monocular optical module.
Figure 1B:
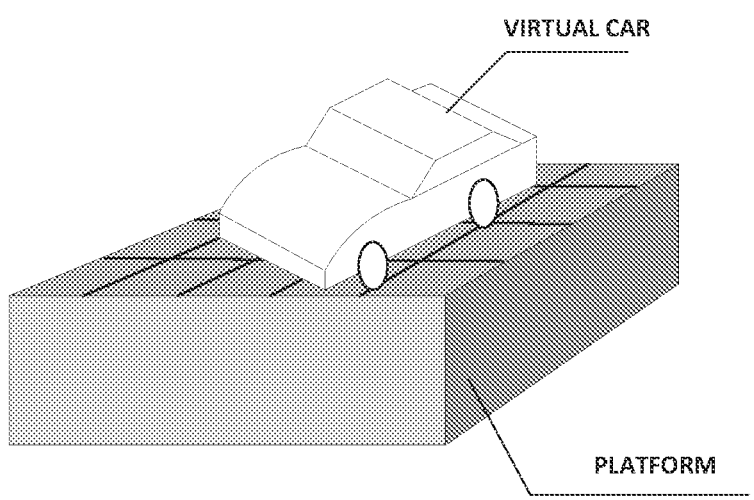

The embodiments according to the present invention will be fully described with respect to the attached drawings. The descriptions are set forth in order to provide an understanding of the invention. However, it will be apparent that the invention can be practiced without these details. Furthermore, the present invention may be implemented in various forms. However, the embodiments of the present invention described below shall not be constructed as limited to the embodiments set forth herein. Rather, these embodiments, drawings and examples are illustrative and are meant to avoid obscuring the invention.

An occlusion capable optical see-through head-mounted display (OCOST-HMD) system typically comprises of a virtual view path for viewing a displayed virtual image and a see-through path for viewing an external scene in the real world. Hereafter the virtual image observed through the virtual view path is referred to as the virtual view and the external scene observed through the see-though path is referred to as the see-through view. In some embodiments of the present invention, the virtual view path includes a microdisplay unit for supplying virtual image content and an eyepiece through which a user views a magnified virtual image. The see-through path comprises of an objective optics to capture the light from the external scene and form at least one intermediate image, a spatial light modular (SLM) placed at or near an intermediate image plane in the see-through path to control and modulate the opaqueness of the see-through view, and an eyepiece through which the modulated see-through view is seen by the viewer. In the see-through path, the objective optics and eyepiece together act as a relay optics for passing the light from the real world to viewer's eye. The intermediate image in the see-through path is referred to as a see-through image, and an intermediate image modulated by the SLIM is referred to as a. modulated see-through image. An OCOST-HMD produces a combined view of the virtual and see-through views, in which the virtual view occludes portions of the see-through view.

A some embodiment, the present invention comprises a. compact optical see-through head-mounted display 200, capable of combining a see-through path 207 with a virtual view path 205 such that the opaqueness of the see-through path can be modulated and the virtual view occludes parts of the see-through view and vice versa, the display comprising:

a. a microdisplay 250 for generating an image to be viewed by a user, the microdisplay having a virtual view path 205 associated therewith;

b. a spatial light modulator 240 for modifying the light from an external scene in the real world to block portions of the see-through view that are to be occluded, the spatial light modulator having a see-through path 207 associated therewith;

c. an objective optics 220 configured to receive the incoming light from the external scene and to focus the light upon the spatial light modulator 240;

d. a beamsplitter 230 configured to merge a virtual image from a microdisplay 250 and a modulated see-through image of an external scene passing from a spatial light modulator, producing a combined image;

e. an eyepiece 210 configured to magnify the combined image;

f. an exit pupil 202 configured to face the eyepiece, where the user observes a combined view of the virtual and see-through views in which the virtual view occludes portions of the see-through view;

g. a plurality of reflective surfaces configured to fold the virtual view path 205 and see-through paths 207 into two layers.

In some embodiments, at least three reflective surfaces are used to fold the virtual and see-through paths into two layers. The first reflective surface (M1) is located upon the front layer of the display oriented to reflect light from the external scene. The objective optics 220 is located upon the front layer of the display. The second reflective surface (M2) is located upon the front layer of the display oriented to reflect light into the spatial light modulator. The spatial light modulator 240 is located at or near an intermediate image plane of the see-through path 207, in optical communication with the objective optics 220 and the eyepiece 210 through the beam splitter 230 along the see-through path 207. The microdisplay 250 is located at the focal plane of the eyepiece 210, in optical communication with the eyepiece 210 through the beamsplitter 230 along the virtual view path 205. The beam splitter 230 is oriented such that the see-through path 207 is merged with virtual view path 205 and the light from both the see-through path and the virtual view path is directed to the eyepiece 210. The eyepiece 210 is located upon the back layer of the display. The third reflective surface (M3) is located upon the back layer of the display oriented to reflect light from the eyepiece into the exit pupil 202.

In some embodiments, the objective optics 220 receives tight of the external scene, and focuses the light of the external scene and forms a. see-through image upon the spatial light modulator 240. The spatial light modulator 240 modifies the see-through image to remove portions of the image that are to be occluded. The microdisplay 250 projects a virtual image to the beam splitter 230. The spatial light modulator 240 transmits the modified see-through image to the beam splitter 230, where the beam splitter 230 merges the two images producing a combined image in which the virtual image occludes portions of the see-through image. The beam splitter 230 then projects the combined image to the eyepiece 210, whereupon the eyepiece projects the image to the exit pupil 202.

In some embodiments, the present invention comprises of an optical see-through head-mounted display 200, capable of combining an external scene in the real world with a virtual view, where the opaqueness of the external scene is modulated and the digitally generated virtual view occludes parts of the external scene and vice versa. The invention comprises, a microdisplay 250 which transmits a virtual image, a spatial light modulator 240 for modifying the light from an external scene, an objective optics 220, which captures an external scene, a beamsplitter 230 configured to merge the digitally generated virtual image from the microdisplay 250 with the modified external scene from the spatial light modulator, an eyepiece 210 magnifying the virtual image and the modified external scene and an exit pupil 202 where the user observes a combined view of the virtual image and the modified external scene.

In some embodiments, at least three reflective surfaces are used to fold the virtual view path 205 and the see-through path 207 into two layers. The objective optics 220 is located on the front layer of the display, while the eyepiece 210 is located on the back layer of the display. A series of mirrors may be used to guide light along the optical paths through the spatial light modulator, beam splitter and eyepiece. The spatial light modulator 240 is located at or near an intermediate image plane in the see-through path. The microdisplay 250 faces the beam splitter 230, so that light from the microdisplay is transmitted into the beam splitter 230. The beam splitter 230 combines light from the microdisplay and the spatial light modulator and is oriented such that the direction of light transmission from the beam splitter is facing the eyepiece 210. The eyepiece 210 is located so that the light from the beam splitter passed through the eyepiece and is transmitted into the exit pupil.

In some embodiments, the objective optics 220 receives an image of the external scene, and reflects or refracts the image to the spatial light modulator 240. The spatial light modulator 240 modifies the light from the external scene to remove portions of the image that are to be occluded, and transmits or reflects the light into the beam splitter. The microdisplay 250 transmits a virtual image to the beam splitter 230, and the beam splitter 230 merges the two images producing a combined image in which the virtual image 205 occludes portions of the image of the external scene. The beam splitter 230 projects the combined image to the eyepiece 210, which passes the image to the exit pupil 208. Thus the user observes the combined image, in which the virtual image appears to occlude portions of the external scene.

Figure 2A:
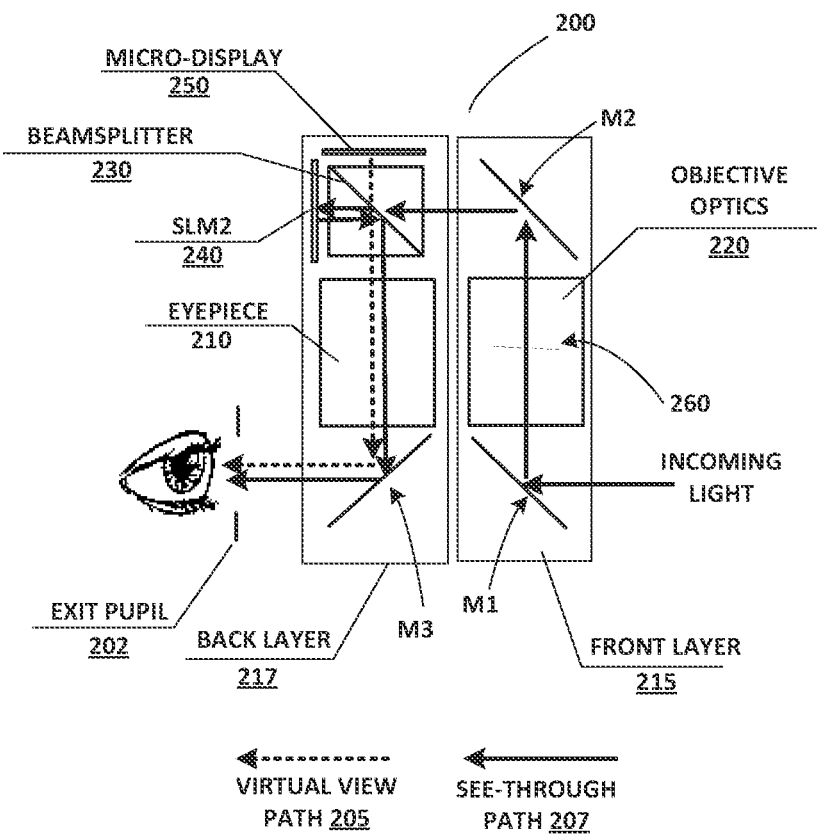
Figure 2B:
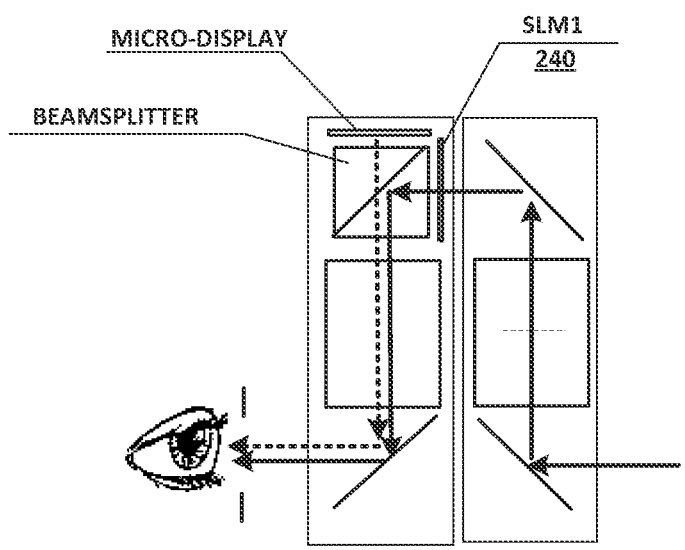

FIG. 2 illustrates a schematic layout 200 in accordance with the present invention for achieving a compact OCOST-HMD system. In this exemplary layout 200, the virtual view path. 205 (illustrated in dash lines) represents the light propagation path of the virtual view and comprises of a microdisplay 250 for supplying display content and eyepiece 210 through which a user views a magnified image of the displayed content; the see-through path 207 (illustrated in solid lines) represents the light propagation path of the see-through view and comprises of both objective optics 220 and eyepiece 210 acting as a relay optics for passing the light from an external scene in the real world to viewer's eye. To achieve a compact form factor and reduce the viewpoint offset, the see-through path 207 is folded into two layers in front of the viewer's eye through several reflective surfaces M1-M3. The front layer 215, accepting the incoming light from an external scene, contains mainly the objective optics 220 and necessary reflective surfaces M1 and M2. The back layer 217, coupling the light captured by the front layer into a viewer's eye, mainly contains the eyepiece 210 and other necessary optical components such as additional folding mirror M3, In the front layer 215, the reflective surface MI directs the incoming light from the external scene toward objective optics 220; and after passing through objective optics 220, the light is folded toward the back layer 217 through the reflective surface M2. The objective optics 220 in the see-through path 207 forms at least one accessible intermediate image. A spatial light modulator (SLM) 240 is placed at or near the location of the accessible intermediate image, which is typically at the back focal plane of the objective optics, to provide opaqueness control and see-through modulation of the see-through view. In the present invention, a SIM is a light control device which can modulates the intensity of the light beam that passes through or is reflected by it. A SLM can be either a reflection-type SLM, e.g., a liquid crystal on silicon (LCoS) display panel or a. digital mirror device (DMD), or a transmission-type SLM, e.g., a liquid crystal display (LCD) panel. Both types of the SLM may be used for modulating the see-through view for occlusion control in the see-through path 207. FIG. 2(a) illustrates an exemplary configuration of using a reflection-type SLM while FIG. 2(b) illustrates the use of a transmission-type SLM. Depending on the focal plane position of objective optics 220, the SLM 240 can be placed at the position of SLM2 with a refection-type SLM in FIG. 2(a), or at the position of SLM1 with a transmission-type SLM in FIG. 2(b). The beamsplitter 230 folds the see-through path 207 and merges it with the virtual view path 205 so that the same the eyepiece 210 is shared for viewing the displayed virtual content and the modulated see-through view. The reflective surface M3 directs the virtual view path 205 and see-through path 207 to exit pupil 202, where the viewer's eye observes a mixed virtual and real view. The reflective surfaces M1-M3 could be either a standing alone element (e.g. mirror) or could be strategically designed to be an integral part of the eyepiece 210 or objective optics 220. The microdisplay 250 and SLIM 240 are both located at the focal plane of the objective optics 220 and are optically conjugate to each other through the beamsplitter 230, which makes the pixel level opaqueness control on the see-through view possible, Though the unit assembling the SLM 240, microdisplay 250, and beamsplitter 230 is included in the back layer as shown in the exemplary figures, it may be incorporated into the front layer when the back focal distance of the eyepiece is larger than that of the objective optics such that it is preferred to place the combiner unit closer to the objective optics. The approach described above enables us to achieve a compact OCOST-HMD solution and minimal view axis shift.

As one of its benefits, the optical layout 200 has applicability to many types of MOD optics, including, without limitation, rotationally symmetric optics and non-rotationally symmetric freeform optics. The reflective surfaces M1-M3 for folding the optical paths may be planar mirrors, spherical, aspherical, or freeform surfaces with optical power. Some of the reflective surfaces may utilize freeform optical technology. Some of the reflective surfaces may also be strategically designed to be an integral part of the eyepiece 210 or objective optics 220 where the reflective surfaces not only facilitate the folding of the optical paths for achieving compact display design but also contribute optical power and correct optical aberrations, In an exemplary configuration shown in FIG. 3, the present invention demonstrated the use of a one-reflection freeform prism as an eyepiece and objective optics where the prism is a single optical element comprises of two refractive surfaces and one reflective surface for folding the optical path and correcting aberrations. In other examples of configurations, multi-reflection freeform prisms are demonstrated.

In another significant aspect of the present invention, besides the intermediate image accessible to the SLM 240, the see-through path 207 may form additional intermediate images 260 by the objective optics 220, or eyepiece 210, or both. For instance, multiple-reflection freeform prism structure (typically more than 2) may be utilized as eyepiece or objective optics, or both, which allow folding the see-through path inside the objective and/or eyepiece prism multiple times and form intermediate image(s) inside the prism. As a result, the see-through path 207 may yield a total odd or even number of intermediate images. The potential advantage of creating more than one intermediate image is the benefit of extended optical path length, long back focal distance, and the elimination of real-view erection element.

Depending on the total number of intermediate images being created and the total number of reflective surfaces being used in the see-through path 207, a see-through view erection method may be needed to invert and/or revert the see-through view of the see-through path to maintain the parity of the coordinate system of the see-through view and prevent a viewer from seeing an inverted or reverted see-through view. As to the see-through view erection method specifically, the present invention considers two different image erection strategies. When a total even number of reflections is involved in the see-through path 207, which induces no change to the parity of the coordinate system of the see-through view, the form of eyepiece 210 and objective optics 220 will be designed such that an even number of intermediate images is created in the see-through path 207. When an odd number of reflections exist along with an odd number of intermediate images in the see-through path 207, which induces parity change, one of the reflective surfaces M1 through M3 may be replaced by a roof mirror surface for the see-through view erection. The preferred embodiments with the view erection using a roof reflection will be discussed below in connection with FIGS. 3 and 5. The preferred embodiments with the view erection using an intermediate image will be discussed below in connection with FIGS. 4, 6 and 7.

Figure 3:
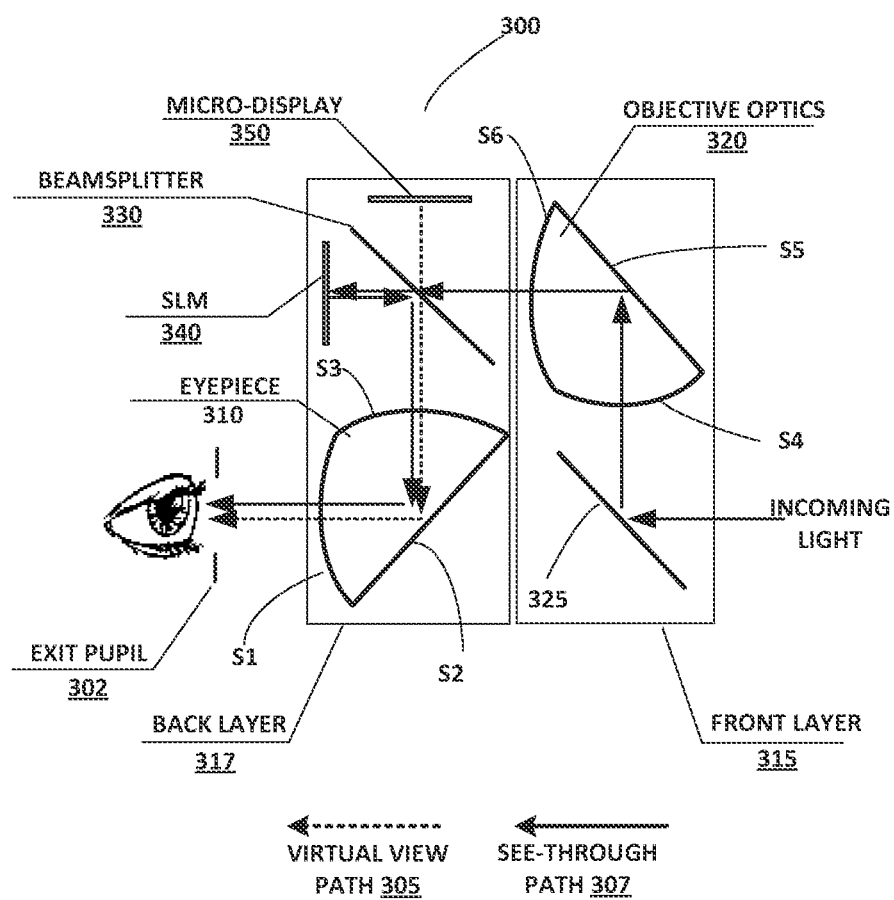
FIG. 3 schematically illustrates a preferred embodiment in accordance with the present invention based on freeform optical technology. The embodiment comprises of a one-reflection eyepiece prism, a one-reflection objective prism, a reflection-type SLM and a roof reflective surface.

In one of its significant aspects, the present invention may utilize freeform optical technology in eyepiece, objective optics or both to achieve a compact and lightweight OCOST-HMD. FIG. 3 shows a block diagram 300 of an exemplary approach to a compact OCOST-HMD design in accordance with the present invention based on freeform optical technology. The eyepiece 310 in the back layer 317 is a one-reflection freeform prism comprising three optical freeform surfaces: refractive surface S1, reflective surface S2 and refractive surface S3. In virtual view path 305, the light ray emitted from microdisplay 350, enters the eyepiece 310 through the refractive surface S3, then is reflected by the reflective surface S2 and exits eyepiece 310 through the refractive surface Si and reaches exit pupil 302, where the viewer's eye is aligned to see a magnified virtual image of microdisplay 350. The objective optics 320 in the front layer 315 is also a one-reflection freeform prism comprising of three optical freeform surfaces: refractive surface S4, reflective surface S5 and refractive surface S6. In the see-through path 307, the objective optics 320 works together with eyepiece 310 act as a relay optics for the see-through view. The incoming light from an external scene reflected by mirror 325, enters the objective optics 320 through the refractive surface S4, then is reflected by the reflective surface S5 and exits the objective optics 320 through refractive surface S6 and forms an intermediate image at its focal plane on SLM 340 for light modulation. The beamsplitter 330 merges the modulated light in the see-through path 307 with the light in the virtual view path 305 and folds toward the eyepiece 310 for viewing. The beamsplitter 330 may be a wire-grid type beamsplitter, a polarized cube beamsplitter or other similar type beamsplitters. In this approach, the SLM 340 is a reflection-type SLM and is located at the SLM2 position of the schematic layout 200 and is optically conjugated to the microdisplay 350 through the beamsplitter 330.

In this exemplary layout 300, the reflective surface M2 of the schematic layout 200 is strategically designed to be an integrated part of the objective prism 320 as freeform reflective surface S5; the reflective surface. M3 of the schematic layout 200 is strategically designed to be an integrated part of the eyepiece prism 310 as freeform reflective surface S2; the reflective surface M1 of schematic layout 200 is designed as a roof type mirror 325 for view erection given that the total number of reflections in see-through path 307 is 5 (an odd number).

In this exemplary layout 300, the eyepiece 310 and the objective optics 320 may have an identical freeform prism structure. The advantage of using an identical structure for the eyepiece and the objective optics is that the optical design strategy of one prism can be readily applied to the other, which helps simplify the optical design. The symmetric structure of the eyepiece and objective optics also helps correcting odd order aberrations, such as coma, distortion, and lateral color.

Figure 4:
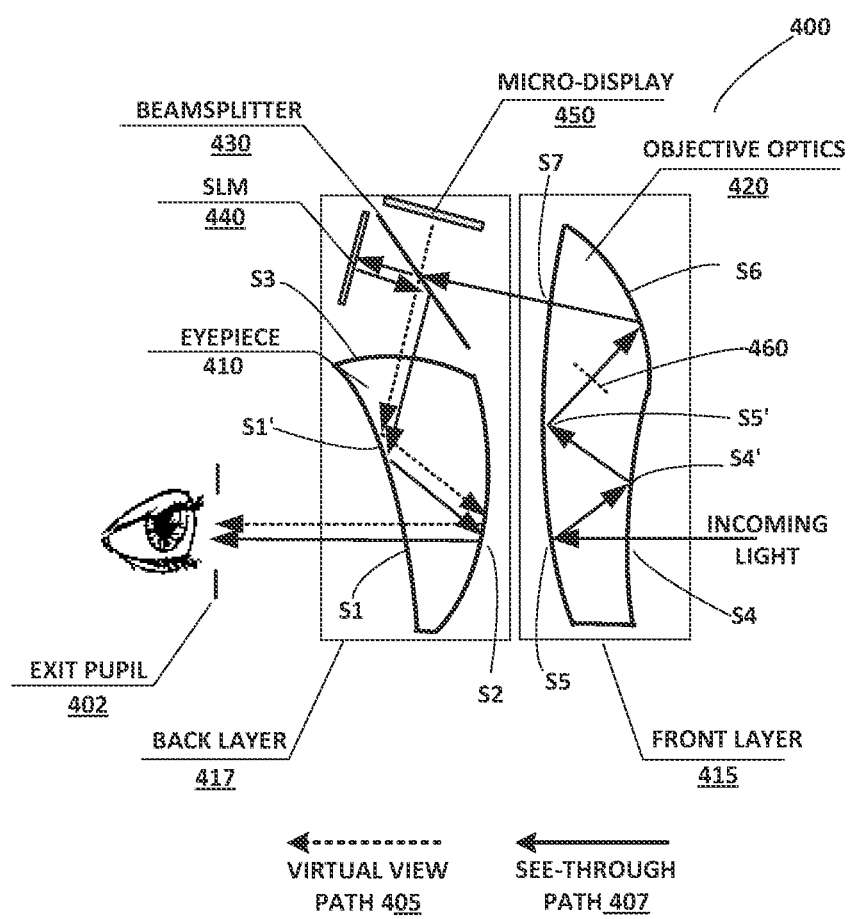
FIG. 4 schematically illustrates another preferred embodiment in accordance with the present invention based on freeform optical technology. The embodiment comprises of a two-reflection eyepiece prism, a four-reflection objective prism, and a reflection-type SLM.

FIG. 4 shows a block diagram 400 of another exemplary approach to a compact OCOST-HMD design in accordance with the present invention based on freeform optical technology. In one exemplary implementation, the eyepiece 410 is a two-reflection prism and the objective optics 420 is a four-reflection prism. Inside the objective optics 420, an intermediate image 460 is formed to erect the see-through view which eliminates the necessity of using an erection roof reflective surface. The potential advantage of eliminating the erection prism is that this system structure may lead to a. more compact design by folding the optical path inside the objective prism multiple times. The eyepiece 410 in the back layer 417 comprises of four optical freeform surfaces: refractive surface Sit reflective surface 52, reflective surface S1' and refractive. surface S3, In the virtual view path 405, the light ray emitted from the microdisplay 450, enters eyepiece 410 through the refractive surface S3, then is consecutively reflected by the reflective surfaces S1' and S2, and exits the eyepiece 410 through the refractive surface S1 and reaches the exit pupil 402, where the viewer's eye is aligned to see a magnified virtual image of microdisplay 450. The refractive surface S1 and the reflective surface S1' may be the same physical surfaces and possess the same set of surface prescriptions. The objective optics 420 in the front layer 415 comprises of six optical freeform surfaces: refractive surface S4, reflective surfaces S5, S4', 55', and S6 and refractive surface S7. In the see-through path 407, the objective optics 420 works together with the eyepiece 410 act as a relay optics for the see-through view. The incoming light from an external scene in the real world enters the objective optics 420 through the refractive surface S4, then is consecutively reflected by the reflective surfaces S5, S4', S5' and S6, and exits the objective optics 420 through the refractive surface S7 and forms an intermediate image at its focal plane on SLM 440 for light modulation. The refractive surface S4 and reflective surface S4' may be the same physical surfaces and possess the same set of surface prescriptions. The reflective surface S5 and the reflective surface S5' may be the same physical surfaces and possess the same set of surface prescriptions. The beamsplitter 430 merges the modulated light in the see-through path 407 with the light in the virtual view path 405 and folds toward the eyepiece 410 for viewing. The beamsplitter 430 may be a wire-grid type beamsplitter, a polarized cube beamsplitter or other similar type beamsplitters. In this approach, the SLM 440 is a reflection-type SLM and is located at the SLM2 position of the schematic layout 200 and is optically conjugated to the microdisplay 450 through beamsplitter 430.

In this exemplary layout 400, the reflective surface M2 of the schematic layout 200 is strategically designed as an integrated part of the objective optics 420 as the reflective surface S6; the reflective surface M3 of the schematic layout 200 is strategically designed as an integrated part of the eyepiece 410 as the reflective surface S2; the reflective surface M1 of schematic layout 200 is designed as an integrated part of the objective optics 420 as the reflective surface S5. An intermediate image 460 is formed inside of the objective optics 410 for the real-view erection. Given that the total number of reflections in the see-through path 407 is 8 (an even number), no roof mirror is required on any reflective surfaces.

Figure 5:
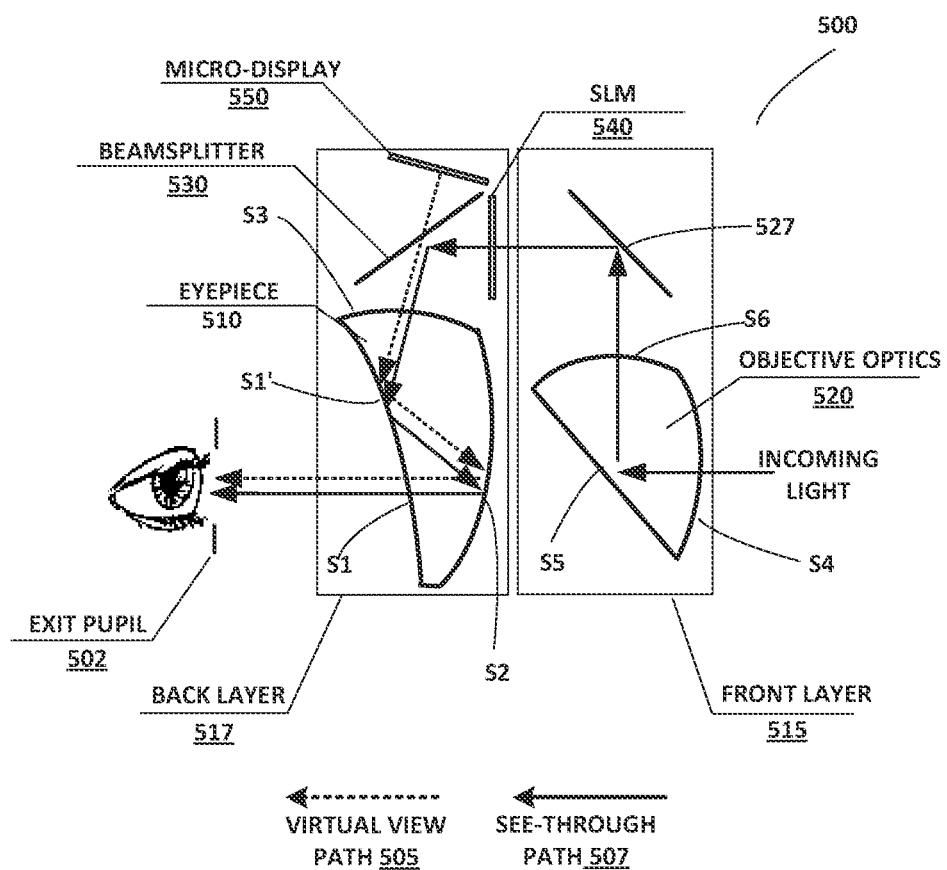
FIG. 5 schematically illustrates another preferred embodiment in accordance with the present invention based on freeform optical technology. The embodiment comprises of a two-reflection eyepiece prism, a one-reflection objective prism, a transmission-type SLM and a roof reflective surface.

FIG. 5 shows a block diagram 500 of another exemplary approach to a compact OCOST-HMD design in accordance with the present invention based on freeform optical technology. This approach facilitates the usage of a transmission-type SLM. The eyepiece 510 is a two-reflection prism and the objective optics 520 is a one-reflection prism. A roof mirror 527 is placed at the top of objective prism 520 to invert the see-through view and to fold the see-through path 507 toward the back layer 517. The eyepiece 510 in the back layer 517 comprises of four optical freeform surfaces: refractive surface S1, reflective surface S2, reflective surface S1' and refractive surface S3, In the virtual view path 505, the light ray emitted from the microdisplay 550, enters the eyepiece 510 through the refractive surface S3, then is consecutively reflected by reflective surfaces Sit and S2, and exits the eyepiece 510 through the refractive surface S1 and reaches exit pupil 502, where the viewer's eye is aligned to see a magnified virtual image of the microdisplay 550. The refractive surface Si and reflective surface S1' may the same physical surfaces and possess the same set of surface prescriptions. The objective optics 520 in the front layer 515 comprises of three optical freeform surfaces: refractive surface S4, reflective surface S5 and refractive surface 56. In the see-through path 507, the objective optics 520 works together with the eyepiece 510 act as a relay optics for the see-through view. The incoming light from an external scene in the real word enters the objective optics 520 through the refractive surface S4, then is reflected by the reflective surface S5 and exits the objective optics 520 through the refractive surface S6 and is folded by the mirror 527 toward the back layer 517 and forms an intermediate image at its focal plane on SLM 540 for light modulation. The beamsplitter 530 merges the modulated light in the see-through path 507 with the light in the virtual view path 505 and folds the merged light toward the eyepiece 510 for viewing. The beamsplitter 530 may be a wire-grid type beamsplitter, a polarized cube beamsplitter or other similar type beamsplitters. In this approach, the SLM 540 is a transmission-type SLM and is located at the SLM, position of the schematic layout 200 and is optically conjugated to the micro-display 550 through the beamsplitter 530.

In this exemplary layout 500, the reflective surface M1 of the schematic layout 200 is strategically designed as an integrated part of objective optics 520 as the reflective surface S5; the reflective surface M3 of the schematic layout 200 is strategically designed as an integrated part of the eyepiece 510 as the reflective surface S2; the reflective surface M2 of the schematic layout 200 is designed as a roof type mirror 527 for view erection given that the total number of reflections in the see-through path 507 is 5 (an odd number).

Figure 6:
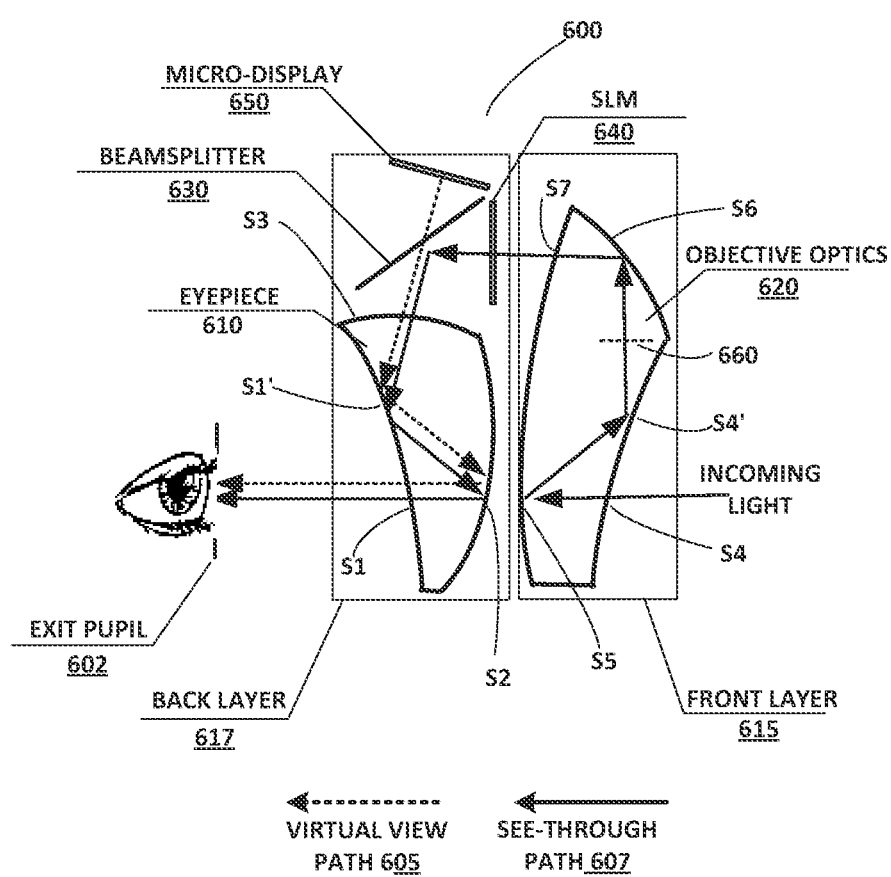
FIG. 6 schematically illustrates another preferred embodiment in accordance with the present invention based on freeform optical technology. The embodiment comprises of a two-reflection eyepiece prism, a three-reflection objective prism and a transmission-type SLM.

FIG. 6 shows a block diagram 600 of another exemplary approach to a compact OCOST-HMD design in accordance with the present invention based on freeform optical technology. This approach also facilitates the usage of a transmission type SLM. In one exemplary implementation, the eyepiece 610 is a two-reflection freeform prism and the objective optics 620 is a three-reflection freeform prism. Inside the objective optics 620, an intermediate image 660 is formed to erect the see-through view. The eyepiece 610 in the back layer 617 comprises of four optical freeform surfaces: refractive surface S1, reflective surface S2, reflective surface S1' and refractive surface S3. In the virtual view path 605, the light ray emitted from the microdisplay 650, enters the eyepiece 610 through the refractive surface S3, then is consecutively reflected by reflective surfaces S1' and S2, and exits the eyepiece 610 through the refractive surface S1 and reaches exit pupil 602, where the viewer's eye is aligned to see a magnified virtual image of the microdisplay 650. The refractive surface S1 and the reflective surface S1' may the same physical surfaces and possess the same set of surface prescriptions. The objective optics 620 in the front layer 615 comprises of five optical freeform surfaces: refractive surface S4, reflective surfaces S5, S4' and S6 and refractive surface S7, In the see-through path 607, the objective optics 620 works together with the eyepiece 610 acting as relay optics for the see-through view. The incoming light from an external scene in the real world enters the objective optics 620 through the refractive surface S4, consecutively reflected by the reflective surfaces S5, S4' and S6, and exits the objective optics 620 through the refractive surface S7 and forms an intermediate image at its focal plane on SLM 640 for light modulation. The refractive surface S4 and the reflective surface S4' may be the same physical surfaces and possess the same set of surface prescriptions. The beamsplitter 630 merges the modulated light in the see-through path 607 with the light in the virtual view path 605 and folds toward the eyepiece 610 for viewing. The beamsplitter 630 may be a wire-grid type beamsplitter, a polarized cube beamsplitter or other similar type beamsplitters in this approach, the SLM 640 is a transmission-type SLM and is located at the SLM1 position of the schematic layout 200 and is optically conjugated to the micro-display 650 through the beamsplitter 630.

Figure 7:
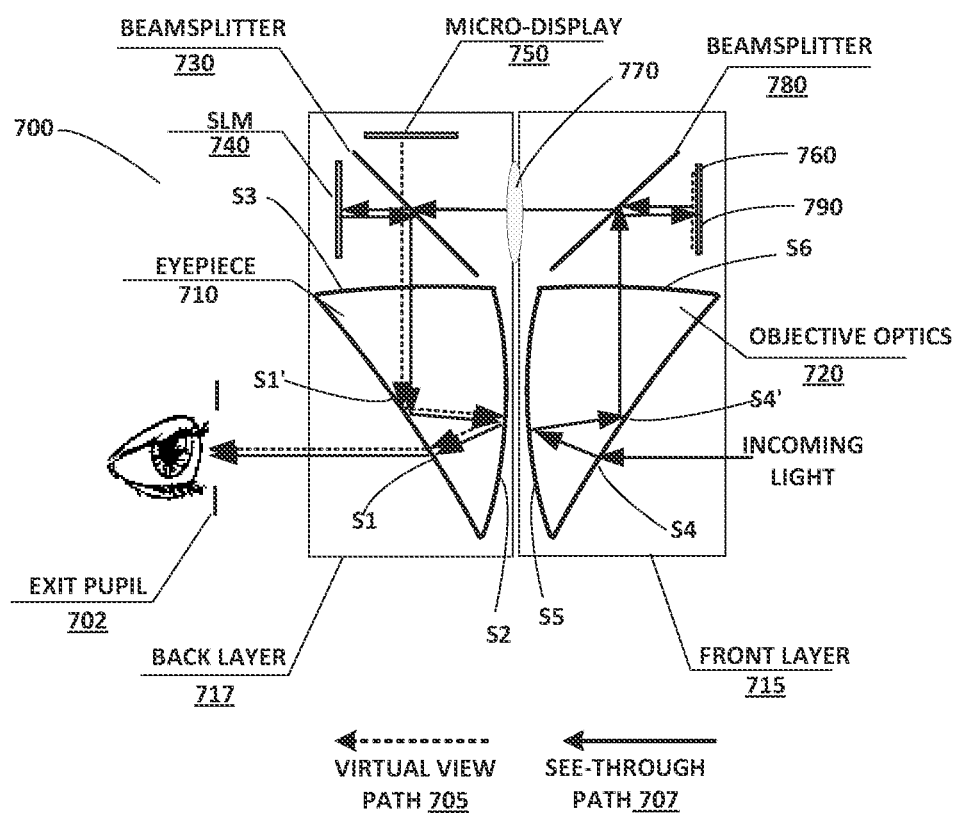
FIG. 7 schematically illustrates another preferred embodiment in accordance with the present invention based on freeform optical technology. The embodiment comprises of a two-reflection eyepiece prism, a two-reflection objective prism, a reflection-type SLM and a relay lens.

In this exemplary layout 600, the reflective surface M1 of the schematic layout 200 is strategically designed as an integrated part of the objective optics 620 as the reflective surface S5; the reflective surface M2 of the schematic layout 200 is strategically designed as an integrated part of the objective optics 620 as the reflective surface S6; the reflective surface M3 of the schematic layout 200 is strategically designed as an integrated part of the eyepiece 610 as the reflective surface S2. An intermediate image 660 is formed inside of the objective optics 610 for real-view erection. Given that the total number of reflections in the see-through path 607 is 6 (an even number), no roof mirror is required on any reflective surface, FIG. 7 shows a block diagram 700 of another exemplary approach to a compact OCOST-HMD design in accordance with the present invention based on freeform optical technology. In one exemplary implementation, both the eyepiece and the objective optics are two-reflection freeform prisms and have nearly identical structure. The advantage of using an identical structure for the eyepiece and objective is that the optical design strategy of one prism can be readily applied to the other, which helps simplify the optical design. The symmetric structure of the eyepiece and objective prisms may also help correcting odd order aberrations, such as coma, distortion, and lateral color. The eyepiece 710 in the back layer 717 comprises of four optical freeform surfaces: refractive surface S1, reflective surface S2, reflective surface S1' and refractive surface S3. In the virtual view path 705, the light ray emitted from the microdisplay 750, enters the eyepiece 710 through the refractive surface S3, then is consecutively reflected by the reflective surfaces S1' and S2, and exits the eyepiece 710 through the refractive surface S1 and reaches exit pupil 702, where the viewer's eye is aligned to see a magnified virtual image of the microdisplay 750. The refractive surface S1 and the reflective surface S1' may the same physical surfaces and possess the same set of surface prescriptions, The objective optics 720 in the front layer 715 comprises of four optical freeform surfaces: refractive surface S4, reflective surfaces S5, S4' and refractive surface S6. In the see-through path 707, the objective optics 720 works together with the eyepiece 710 acting as a relay optics for the see-through view. The incoming light from an external scene in the real world enters the Objective optics 720 through the refractive surface S4, consecutively reflected by the reflective surfaces S5, S4', and exits the objective optics 720 through the refractive surface S6 and forms an intermediate image 760 at its focal plane. The beamsplitter 780 folds the see-through path 707 away from the back layer 715 toward the mirror 790 positioned at the focal plane of the objective optics 720. The see-through path 707 is reflected by the mirror 790 back toward the back layer 715. A relay lens 770 is used to create an image of the intermediate image 760 at the SLM2 position of the schematic layout 200 for view modulation. The beamsplitter 730 merges the modulated light in the see-through path 707 with the light in the virtual view path 705 and folds toward the eyepiece 710 for viewing. In this approach, the SLM 740 is a reflection-type SLM and is optically conjugated to the microdisplay 750 through beamsplitter 730. Due to the fact that the intermediate image 760 is optically conjugated to the SLM 740, the positions of the SIM 740 and the mirror 790 are interchangeable.

In this exemplary layout 700, the reflective surface M1 of the schematic layout 200 is strategically designed as an integrated part of the objective optics 720 as the reflective surface S5; the reflective surface M3 of the schematic layout 200 is strategically designed as an integrated part of the eyepiece 710 as the reflective surface S2; the reflective surface M2 of the schematic layout 200 is positioned at the focal plane of the Objective optics 710 as the mirror 790 and folds the see-through path 707 toward the virtual view path 705; The intermediate image 760 is formed at the focal plane of the objective optics 720 for real-view erection. Given that the total number of reflections in the see-through path 707 is 8 (an even number), no roof mirror is required on any reflective surface.

Figure 8:
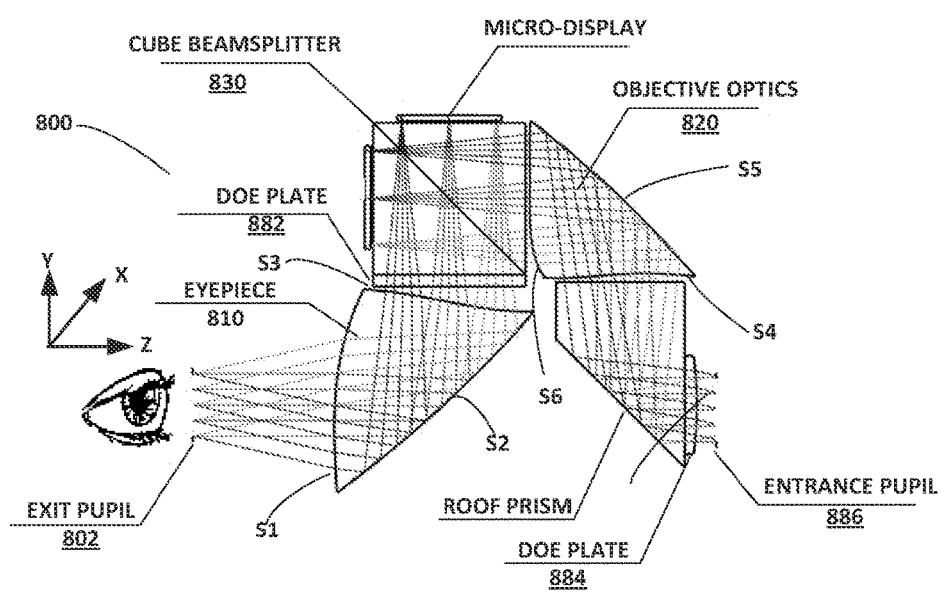
FIG. 8 schematically illustrates an exemplary design of an OCOST-HMD system in accordance with the present invention based on an exemplary layout in FIG. 3.

FIG. 8 schematically illustrated an exemplary design 800 based on the exemplary approach depicted in FIG. 3. The design achieved a diagonal FOV of 40 degrees, which is 31.7 degrees in the horizontal direction (X-axis direction) and 25.6 degrees in the vertical direction (Y-axis direction), an exit pupil diameter (ETD) of 8 mm (non-vignetted), and an eye clearance of 18 mm. The design is based on a 0.8" microdisplay with a 5:4 aspect ratio and a 1280×1024 pixel resolution. The microdisplay has an effective area of 15.36 mm and 12.29 mm and a pixel size of 12 m. The design used a SLM of the same size and resolution as the microdisplay. A polarized cube beamsplitter is used to combine the virtual view path and the see-through path. DOE plates 882 and 884 are used to correct chromatic aberrations. The system is measured as 43 mm(X)×23 mm (Y)×44.5 mm (Z). The viewpoint shifts between the entrance pupil 886 and exit pupil 802 are 0.6 mm in Y direction and 67 mm in Z direction, respectively.

An exemplary optical prescription of the eyepiece 810 is listed in the Tables 1-4. All the three optical surfaces in the eyepiece 810 are anamorphic aspheric surface (AAS), The sag of an AAS surface is defined by $$z = \frac{c_x x^2 + c_y y^2}{1 + \sqrt{1 - (1 + K_x)c_x^2 y^2}} + \\ AR\{(1-AP)x^2 + (1+AP)y^2\}^2 + \{(1-BP)x^2 + (1+BP)y^2\}^3 + \\ CR\{(1-CP)x^2 + (1+CP)y^2\}^4 + DR\{(1-DP)x^2 + (1+DP)y^2\}^5,$$

where z is the sag of the free-form surface measured along the z-axis of a local x, y, z coordinate system, $c_x$ and $c_y$ are the vertex curvature in x and y axes, respectively, $K_x$ and $K_y$ are the conic constant in x and y axes, respectively, AR, BR, CR and DR are the rotationally symmetric portion of the 4th, 6th, 8th, and 10th order deformation from the conic, AP, BP, CP, and DP are the non-rotationally symmetric components of the 4th, 6th, 8th, and 10th order deformation from the conic.

Table 1: Optical surface prescription of surface 1 of the eyepiece prism, See FIG. 13.
Table 2: Optical surface prescription of surface 2 of the eyepiece prism, See FIG. 14
Table 3: Optical surface prescription of surface 3 of the eyepiece prism, See FIG. 15
Table 4: Position and orientation parameters of the eyepiece prism, See FIG. 16

An exemplary optical prescription of the objective optics 820 is listed in the Tables 5-8. All the three optical surfaces in the objective optics 820 are anamorphic aspheric surface (AAS).

Table 5: Optical surface prescription of surface 4 of the objective prism, See FIG. 17.
Table 6: Optical surface prescription of surface 5 of the objective prism, See FIG. 18.
Table 7: Optical surface prescription of surface 6 of the objective prism, See FIG. 19.
Table 8: Position and orientation parameters of the objective prism, See FIG. 20.

An exemplary optical prescription of the DOE plate 882 and 884 is listed in the Tables 9.
Table 9: Surface parameters for DOE plates 882 and 884. See FIG. 21.

Figure 9:
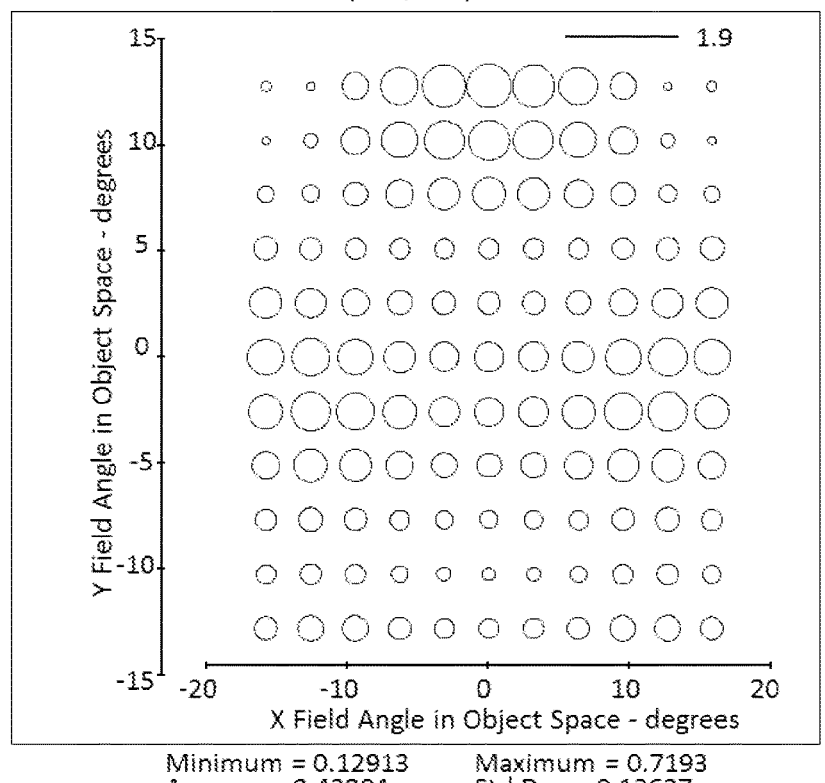
FIG. 9 illustrates the field map plot of the polychromatic modulation transfer functions (MTF) of the virtual display path of the design in FIG. 8 at cutoff frequency 40 ps/min (line pairs per millimeter) evaluated using 3 min pupil diameter.

FIG. 9 shows the field map of polychromatic modulation transfer functions (MTF) of the virtual display path at cutoff frequency 401 ps/min (line pairs per millimeter) evaluated using 3 mm pupil diameter. The 401 ps/mm cutoff frequency was determined from the pixel size of the microdisplay. The plot shows that our design has very good performance for majority fields except two upper display corners whose MTF values at cutoff frequency are little less than 15%). Across the entire FOV the distortion of the virtual display path is less than 2.9%, while the distortion of the see-through path is less than 0.5%. The total estimated weight for the optics alone is 33 grams per eye.

Figure 10:
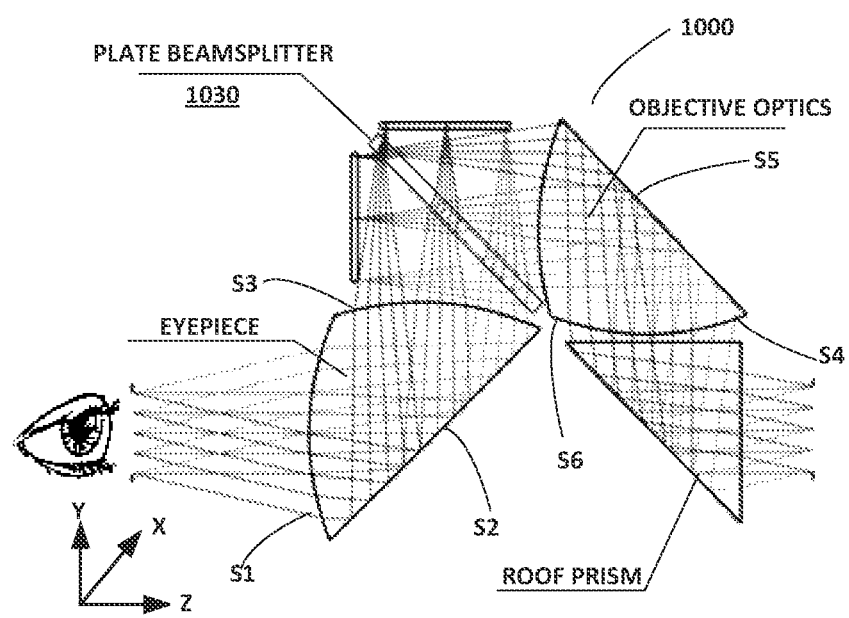
FIG. 10 schematically illustrate an exemplary design of an OCOST-HMD system in accordance with the present invention based on an exemplary layout in FIG. 3 with the eyepiece and objective optics having identical freeform structure.

FIG. 10 schematically illustrated an exemplary design 1000 based on the exemplary approach depicted in FIG. 3. The design achieved a diagonal FOV of 40 degrees with 35.2 degrees horizontally (X-direction) and 20.2 degrees vertically (V-direction), an exit pupil diameter (EPD) of 8 ram (non-vignetted), and an eye clearance of 18 mm. The design is based on a 0.7" microdisplay with a 16:9 aspect ratio and a 1280×720 pixel resolution. The design used a SLM of the same size and resolution as the microdisplay. A wire-grid plate beamsplitter is used to combine the virtual view path and the see-through path. The same freeform prism is used as the eyepiece and the objective optics.

An exemplary optical prescription of the freeform prism is listed in the Tables 10-15. Two surfaces in the prism are anamorphic aspheric surface (AAS) and one is aspheric surface (ASP). The sag of an ASP surface is defined by $$z = \frac{cr^2}{1+\sqrt{1-(1+K)c^2r^2}} + Ar^4 + Br^6 + Cr^8 + Dr^{10} + Er^{12} + Fr^{14}Gr^{16} + Hr^{18} + Jr^{20}$$

where z is the sag of the surface measured along the z-axis of a local x, y, z coordinate system, c is the vertex curvature, k is the conic constant, A through J are the 4th, 6th, 8th, 10th, 12th, 14th, 16th, 18th, and 20th order deformation coefficients, respectively.

Table 10: Optical surface prescription of surface 1 of the freeform prism, See FIG. 22

Table 11: Optical surface prescription of surface 2 of the freeform prism, See FIG. 23.

Table 12: Optical surface prescription of surface 3 of the freeform prism, See FIG. 24.

Table 13: Position and orientation and orientation parameters of the freeform prism as the eyepiece, See FIG. 25.

Figure 11:
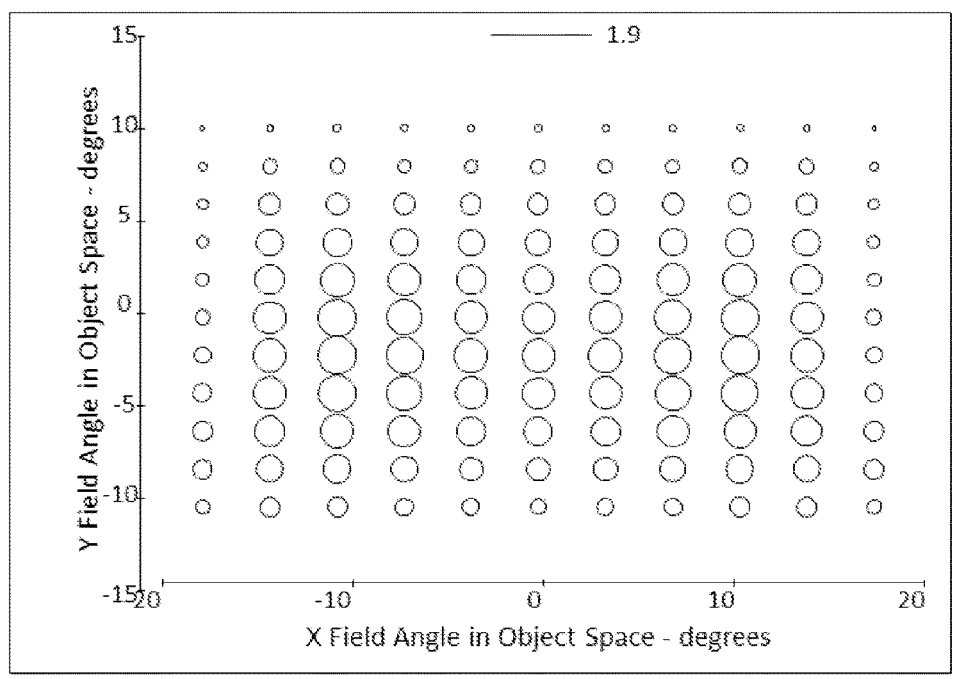
FIG. 11 illustrates the field map plot of the polychromatic modulation transfer functions (MTF) of the virtual display path of the design in FIG. 10 at cutoff frequency 401 ps/mm (line pairs per millimeter) evaluated using 3 mm pupil diameter.

FIG. 11 shows the field map of polychromatic modulation transfer functions (MTF) of the virtual display path at cutoff frequency 401 psi/mm (line pairs per millimeter) evaluated using 3 mm pupil diameter. The plot shows that our design has very good performance for majority fields.

Figure 12:
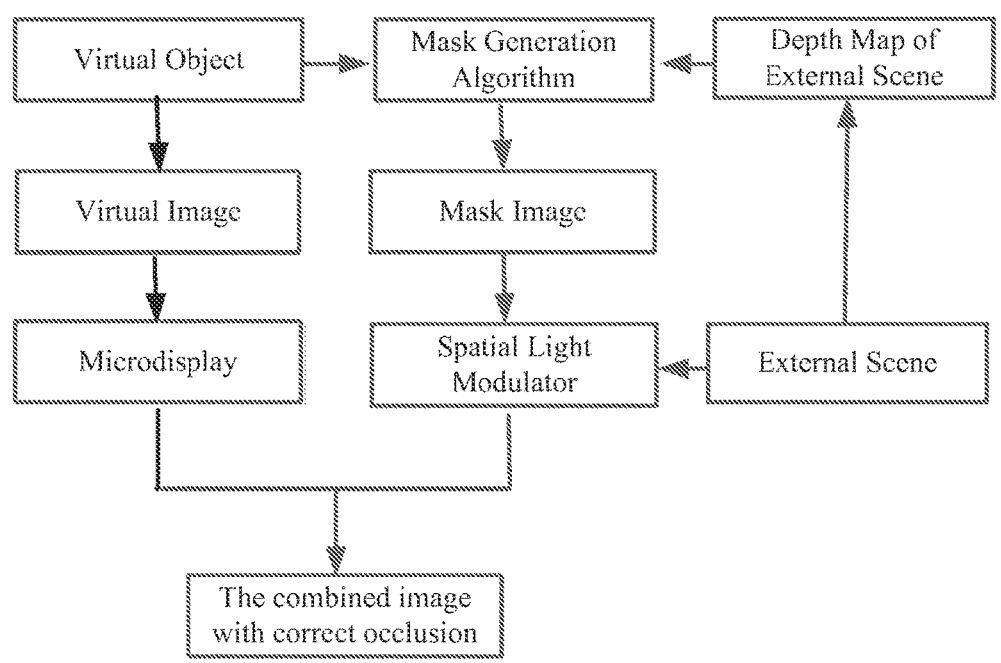
FIG. 12 depicts a block diagram of an example of an image processing pipeline in accordance with the present invention.

FIG. 12 depicts a block diagram of an example of an image processing pipeline necessary for the present invention. Firstly, the depth map of the external scene is extracted using proper depth sensing means. Then, the virtual object is compared with the depth map to determine the regions where the occlusion occurs. A mask generation algorithm creates a binary mask image according to the pre-determined occlusion regions. The mask image is then displayed on spatial light modulator to block the light from the occluded region in the intermediate image of the external scene. A virtual image of the virtual object is rendered and displayed on the micro-display. The viewer observes a combined image of the virtual image and the modulated see-through image of the external scene through the display device of the present invention, Compared to the prior art, the present invention features a folded image path that permits the invention to be compressed into a compact form, more easily wearable as a head-mounted display. In the prior art (U.S. Pat. No. 7,639, 208 B1), the optical path is linearly arranged using rotationally symmetric lenses. As a result the prior art occlusion-type displays have a long telescope-like shape, which is unwieldy for wearing on the head. The present invention folds the image path using reflective surfaces into two layers to that the spatial light modulator, microdisplay and beamsplitter, are mounted to the top of the head, rather than linearly in front of the eye.

The prior art relies on only a reflection type spatial light modulator, while the present invention may use either a reflection or transmission type spatial light modulator. Moreover, the prior art requires a polarized beamsplitter to modulate the external image, while the present. invention does not necessitate polarization.

Since the present invention is arrange in layers, the eyepiece and the objective optics are not necessarily collinear, as in the case in the prior art. The objective optics is also not necessarily tele-centric.

In the prior art, due to the optics of the system the view of the world is a mirror reflection of the see-through view. The present invention the folded image path allows a roof mirror to be inserted to maintain parity between the view of the user and the external scene. This makes the present invention more functional from the user's perspective.

Compared to the prior art, the present invention makes use of freeform optical. technology, which allows the system to be made even more compact. The freeform optical surfaces can be designed to reflect light internally multiple times, so that mirrors may not be needed to fold the light path.

In the present invention, the reflective surfaces for folding the optical paths may be planar mirrors, spherical, aspherical, or freeform surfaces with optical power. A significant aspect of the present invention lies in that some of the reflective surfaces utilize freeform optical technology, which helps to boost the optical performance and compactness. In the present invention, sonic of the reflective surfaces are strategically designed to be an integral part of the eyepiece or objective optics where the reflective surfaces not only facilitate the folding of the optical path for achieving compact display design but also contribute optical power and correct optical aberrations. For example, in FIG. 2, the reflective surfaces M1-M3 were shown as generic mirrors separate from the eyepiece and objective optics. In FIG. 3, two of the mirrors (M2 and M3) are freeform surfaces incorporated into the freeform eyepiece and Objective prisms as S2 and S5. In FIG. 4, 4 reflective freeform surfaces were incorporated into the freeform objective prism and 2 were incorporated into the freeform eyepiece prisms. In FIG. 5, 1 freeform surface was in the objective prism, 2 freeform surfaces were in the eyepiece, in addition to a roof prism. In FIG. 6, 3 freeform surfaces are in the objective and 2 freeform surfaces in the eyepiece. In FIG. 7, 2 reflective freeform mirrors are in the objective, 2 freeform mirrors are in the eyepiece, in addition to a mirror 790 and a. beamsplitter 780.

Our invention ensures that the see-through view seen through the system is correctly erected (neither inverted nor reverted). Two different optical methods were utilized in our embodiments for achieving this, depending on the number of intermediate images formed in the see-through path and the number of reflections involved in the see-through path. In the case of an odd number of intermediate images, an optical method is provided to invert and/or revert the see-through view in the see-through path. For example, depending on the number of reflections involved in the see-through path, examples of the possible methods include, but not limited to, inserting an additional reflection or reflections, utilizing a roof mirror surface, or inserting an erector lens, in the case of an even number of intermediate images, no image erection element is needed if no parity change is needed. For instance, multiple-reflection freeform prism structure (typical more than 2) may be utilized as eyepiece or objective optics, or both, which allow folding the see-through optical path inside the objective and/or eyepiece prism multiple times and form intermediate image(s inside the prism to erect the see-through view which eliminates the necessity of using an erection roof reflective surface.

In FIG. 3, only 1 intermediate image is created in the see-through path. This structure utilized a roof prism for 325 to properly create an erected see-through view.

In FIG. 4, a 4-reflection freeform prism was utilized as an objective optics, which created 2 intermediate images (one for SLM 440, and one 460 inside the prism). Additionally, there were total 8 reflections involved in the see-through path, which leads to no parity change. Therefore, an erected view is created, It is worth mention that the structure of the objective and eyepiece may be exchanged for the same results.

In FIG. 5, 1 intermediate image is created in the see-through path for the SIM. This design utilized a roof prism 527 to erect the see-through view.

In FIG. 6, a 3-reflection freeform prism was utilized as an objective optics, which created 2 intermediate images (one for SLM 640, and one 660 inside the prism). Additionally, there were total 6 reflections involved in the see-through path, which leads to no parity change. Therefore, an erected view is created, It is worth mention that the structure of the objective and eyepiece may be exchanged for the same results.

In FIG. 7, the objective optics 720 utilized only 2 reflections, the combination of the beamsplitter 780 and the mirror 790 facilitated the creation of 2 intermediate images in the see-through path (one for the SLM 740 and an additional one 760). Additionally, total 8 reflections were involved in the see-through path. Therefore, en erected see-through view was created.

It is very important for a see-through head mounted display to maintain the parity of the external scene which provides the users a realistic experience as their usual views without a HMD.

Although there has been shown and described the preferred embodiment of the present invention, it will be readily apparent to those skilled in the art that modifications may be made thereto which do not exceed the scope of the appended claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures.

The reference numbers recited in the below claims are solely for ease of examination of this patent application, and are exemplary, and are not intended in any way to limit the scope of the claims to the particular features having the corresponding reference numbers in the drawings.

What is claimed:

1. A compact optical see-through head-mounted display, capable of combining a see-through path with a virtual view path such that the opaqueness of the see-through path can be modulated and the virtual view occludes parts of the see-through view and vice versa, the display comprising:
    a. a microdisplay for generating an image to be viewed by a user, the microdisplay having a virtual view path associated therewith;
    b. a reflection-type spatial light modulator for modifying the light from an external scene to block portions of the see-through view that are to be occluded, the spatial light modulator having a see-through path associated therewith;
    c. an objective optics, facing an external scene, configured to receive the incoming light from the external scene and to focus the light upon the spatial light modulator, where the objective optics is a four-reflection freeform prism, comprising six optical freeform surfaces: refractive surface S4, reflective surfaces S5, S4', S5', and S6 and refractive surface S7, where the objective optics is configured to form an intermediate image inside the objective optics;
    d. a beamsplitter configured to merge a digitally generated virtual image from a microdisplay and a modulated see-through image of an external scene passing from a spatial light modulator, producing a combined image;
    e. an eyepiece configured to magnify the combined image, where the eyepiece (410) is a two-reflection freeform prism, comprising four optical freeform surfaces, refractive surface S1, reflective surface S2, reflective surface S1' and refractive surface S3;
    f. an exit pupil configured to face the eyepiece, the exit pupil whereupon the user observes the combined view of the virtual and see-through views in which the virtual view occludes portions of the see-through view;
    wherein the objective optics is disposed upon the front layer of the display, where the spatial light modulator is disposed on the back layer of the display at or near an intermediate image plane of the see-through path, facing a side of the beam splitter, where the microdisplay is disposed on the back layer of the display, facing a different side of the beam splitter, where the beam splitter is disposed such that the see-through path is merged with the virtual view path and the light from the merged path is directed to the eyepiece, wherein the eyepiece is disposed upon the back layer of the display, whereupon the incoming light from the external scene enters the objective optics through the refractive surface S4, then is consecutively reflected by the reflective surfaces S5, S4', S5' and S6, and exits the objective prism through the refractive surface S7, whereupon the incoming light forms an intermediate image at its focal plane on the spatial light modulator, whereupon the spatial light modulator modulates the light in the see-through path to occlude portions of the see-through view, whereupon the spatial light modulator reflects the modulated light into the beam splitter, whereupon the light from the microdisplay enters the beam splitter, whereupon the beamsplitter merges the modulated light in the see-through path with the light in the virtual view path and folds toward the eyepiece for viewing, whereupon the light from the beam splitter enters the eyepiece through the refractive surface S3, then is consecutively reflected by the reflective surfaces S1' and S2, and exits the eyepiece through the refractive surface S1 and reaches the exit pupil, where the viewer's eye is aligned to see a combined view of see a combined view of a virtual view and a modulated see-through view.

2. The system of claim 1, where the refractive surface S4 and the reflective surface S4' are the same physical surfaces and possess the same set of surface prescriptions.

* * * * *